United States Patent
Campbell

(10) Patent No.: US 9,706,878 B1
(45) Date of Patent: Jul. 18, 2017

(54) INTEGRATED CLOSURE-STIRRER COOKWARE DEVICE

(71) Applicant: Bobbie Campbell, Winter Haven, FL (US)

(72) Inventor: Bobbie Campbell, Winter Haven, FL (US)

( * ) Notice: Subject to any disclaimer, the term of this patent is extended or adjusted under 35 U.S.C. 154(b) by 0 days.

(21) Appl. No.: 15/049,230

(22) Filed: Feb. 22, 2016

(51) Int. Cl.
| | |
|---|---|
| *A47J 43/044* | (2006.01) |
| *A47J 36/02* | (2006.01) |
| *A47J 36/10* | (2006.01) |
| *A47J 27/12* | (2006.01) |
| *B65D 51/32* | (2006.01) |
| *B65D 47/32* | (2006.01) |
| *A47J 43/07* | (2006.01) |
| *B01F 7/00* | (2006.01) |

(52) U.S. Cl.
CPC ............. *A47J 43/044* (2013.01); *A47J 27/12* (2013.01); *A47J 36/02* (2013.01); *A47J 36/10* (2013.01); *A47J 43/0711* (2013.01); *B01F 7/00941* (2013.01); *B65D 47/32* (2013.01); *B65D 51/32* (2013.01)

(58) Field of Classification Search
CPC ............. B01F 7/00933; B01F 7/00941; B01F 7/00991; B01F 7/14; B01F 7/30; B01F 15/00792; B01F 15/00798; A47J 43/044; A47J 43/0711; A47J 36/02; A47J 36/10; A47J 27/12; B65D 51/32; B65D 47/32
USPC .......... 366/241–251, 288; 220/345.4; 99/348
See application file for complete search history.

(56) References Cited

U.S. PATENT DOCUMENTS

| | | | | |
|---|---|---|---|---|
| 2,559,196 | A * | 7/1951 | Medved | A47J 37/101 220/367.1 |
| 2,719,703 | A * | 10/1955 | Boakes | A47J 36/165 366/244 |
| 5,516,208 | A * | 5/1996 | Givant | A47J 36/165 366/251 |
| 5,586,676 | A * | 12/1996 | Lynd | B65D 51/246 215/228 |
| 5,711,602 | A * | 1/1998 | Rohring | A47J 36/165 366/251 |
| 5,816,136 | A * | 10/1998 | Stallings | A47J 36/165 366/251 |
| 8,172,452 | B2 * | 5/2012 | Bacon | B65D 51/32 366/130 |
| 8,794,822 | B2 * | 8/2014 | Serra | A47G 19/2205 366/130 |
| 9,227,165 | B1 * | 1/2016 | Gedeon-Janvier | B01F 7/00583 |
| 9,380,899 | B2 * | 7/2016 | Taylor | A47G 19/2272 |

(Continued)

*Primary Examiner* — Charles Cooley

(57) ABSTRACT

An integrated closure-stirrer cookware device for stirring while the closure is attached to the cookware includes a pot having an open top. An outer lid, which is complementary to the open top, is reversibly couplable to the pot. The outer lid is not rotatable relative to the pot. An opening, which is circular, is positioned in the outer lid. An inner lid, which is complementary to the opening, is sealably and rotatably coupled to the outer lid. The inner lid is rotatable relative to the outer lid. A stirrer that has a top end and a working end is positioned through a penetration positioned in the inner lid. The penetration is positioned proximate to a perimeter of the inner lid. The working end extends transversely from a bottom of the inner lid. A vent is positioned through the outer lid such that steam escaping through the vent is directed away from the inner lid.

19 Claims, 5 Drawing Sheets

(56) References Cited

U.S. PATENT DOCUMENTS

| | | | |
|---|---|---|---|
| 9,399,538 B2* | 7/2016 | Taylor | B65D 51/32 |
| 2005/0172827 A1* | 8/2005 | Kim | A47J 36/38 |
| | | | 99/348 |
| 2010/0308046 A1* | 12/2010 | Serra | A47G 19/2205 |
| | | | 220/212 |
| 2015/0090716 A1* | 4/2015 | Wilson | A47J 36/165 |
| | | | 220/212 |
| 2015/0164253 A1* | 6/2015 | Taylor | A47G 19/2272 |
| | | | 220/212 |
| 2015/0166231 A1* | 6/2015 | Taylor | B65D 51/32 |
| | | | 220/212 |

\* cited by examiner

INTEGRATED CLOSURE-STIRRER COOKWARE DEVICE

BACKGROUND OF THE DISCLOSURE

Field of the Disclosure

The disclosure relates to cookware devices and more particularly pertains to a new cookware closure device for stirring while the closure is attached to the cookware.

SUMMARY OF THE DISCLOSURE

An embodiment of the disclosure meets the needs presented above by generally comprising a pot having an open top. An outer lid, which is complementary to the open top, is reversibly couplable to the pot. The outer lid is not rotatable relative to the pot. An opening, which is circular, is positioned in the outer lid. An inner lid, which is complementary to the opening, is sealably and rotatably coupled to the outer lid. The inner lid is rotatable relative to the outer lid. A stirrer that has a top end and a working end is positioned through a penetration positioned in the inner lid. The penetration is positioned proximate to a perimeter of the inner lid. The working end extends transversely from a bottom of the inner lid. A vent is positioned through the outer lid such that steam escaping through the vent is directed away from the inner lid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
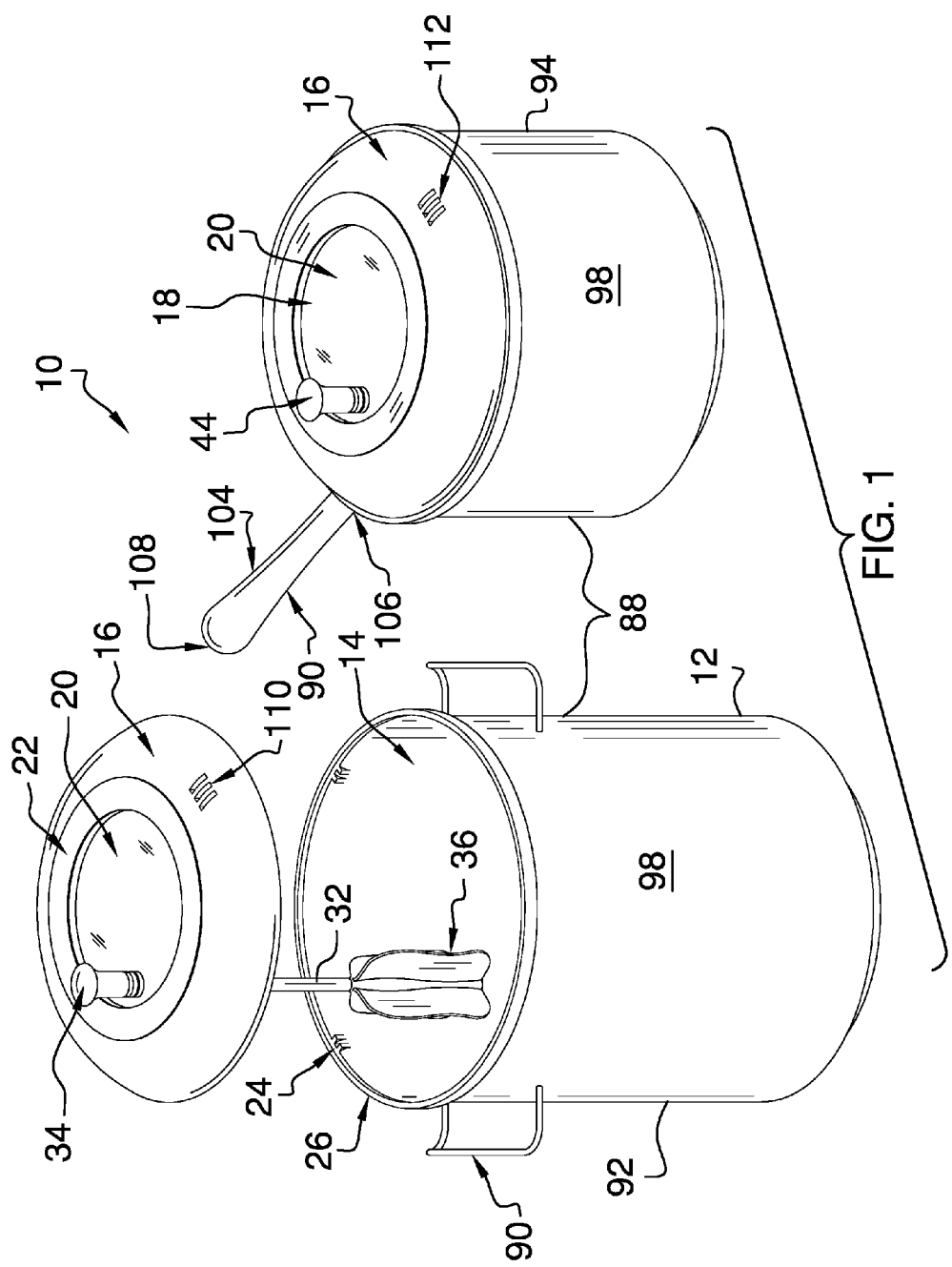
FIG. 1 is an isometric perspective view of an integrated closure-stirrer cookware device according to an embodiment of the disclosure.
Figure 2:
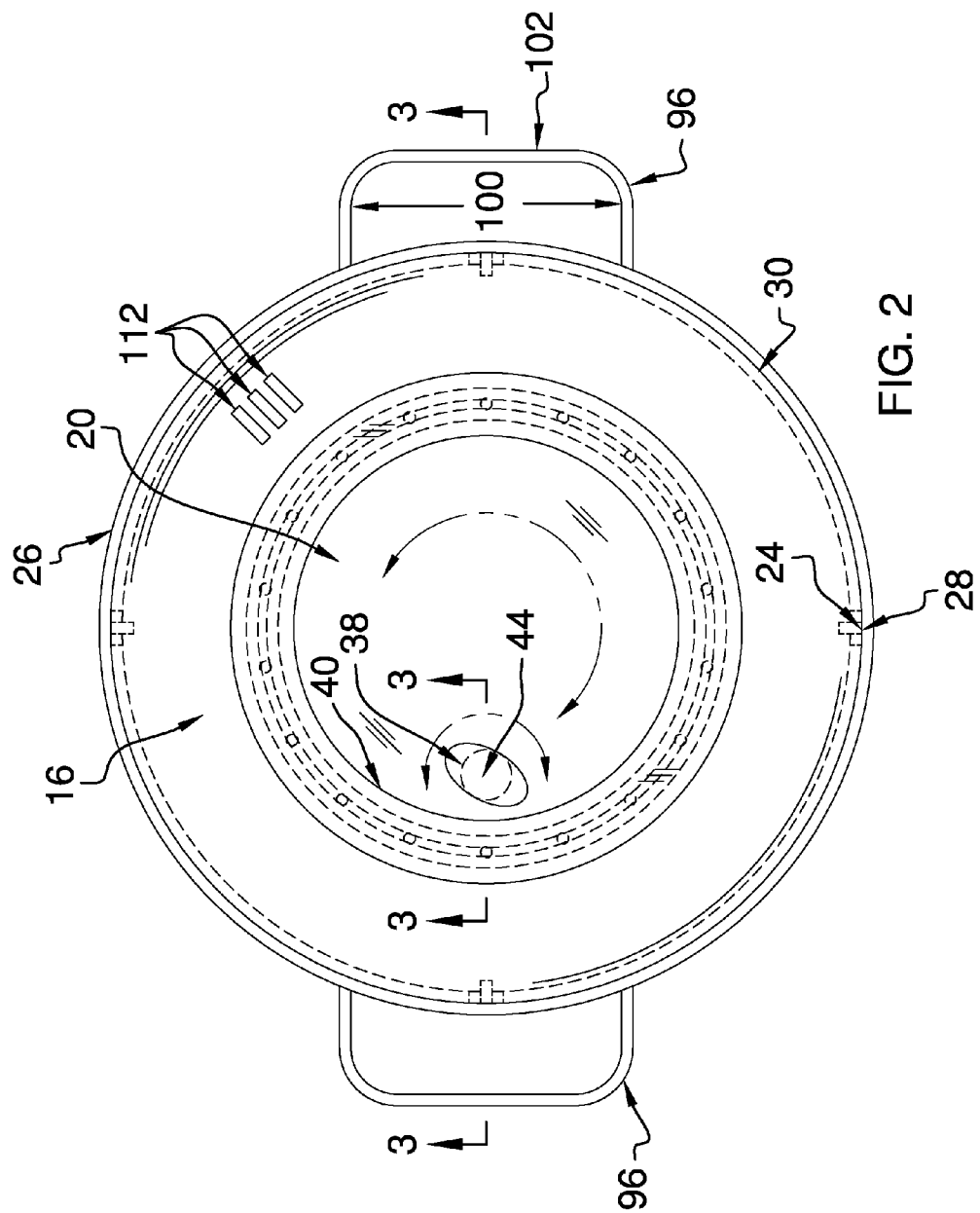
FIG. 2 is a top view of an embodiment of the disclosure.
Figure 3:
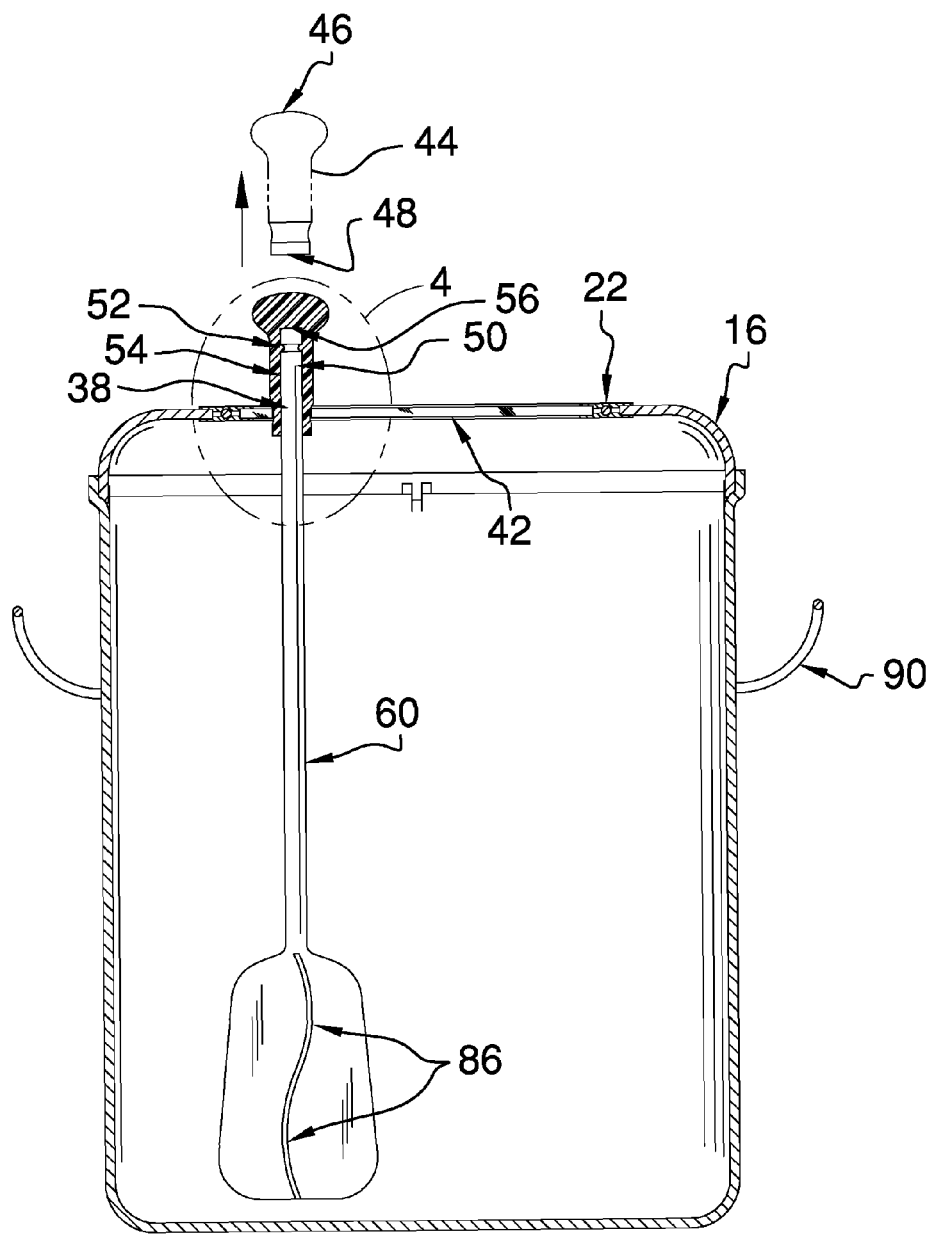
FIG. 3 is a cross-sectional view of an embodiment of the disclosure.
Figure 4:
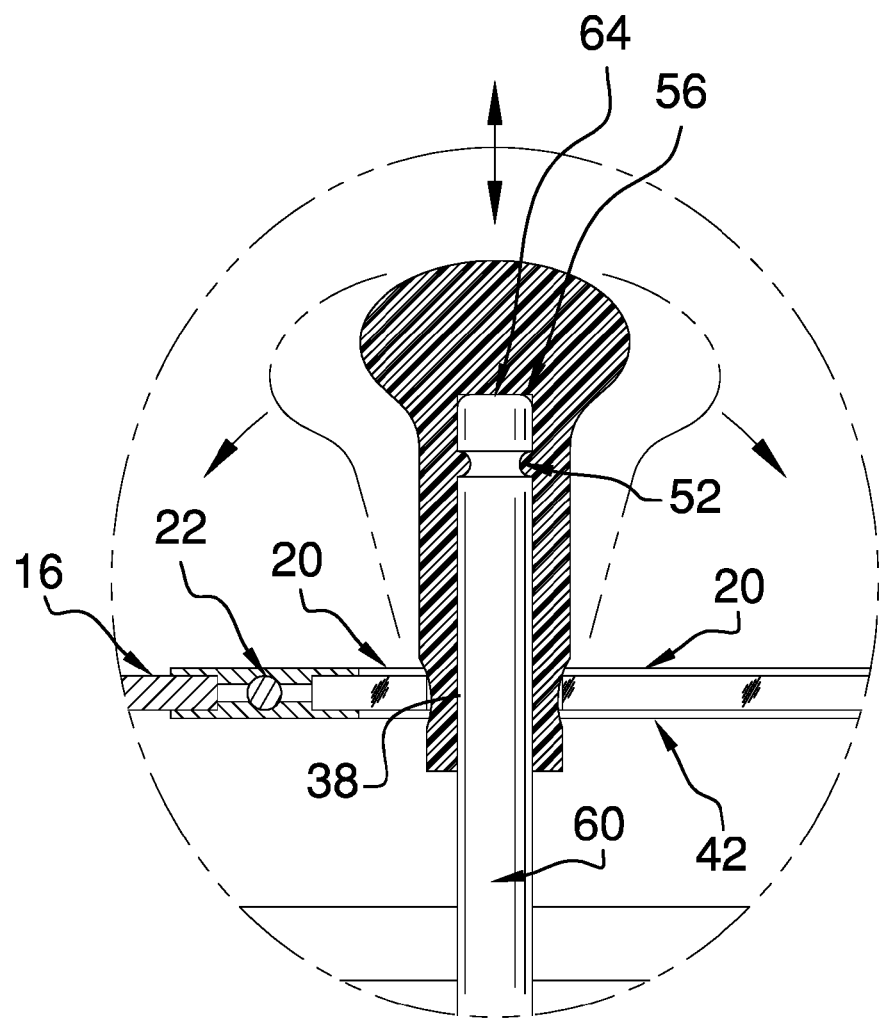
FIG. 4 is a detail view of an embodiment of the disclosure.
Figure 5:
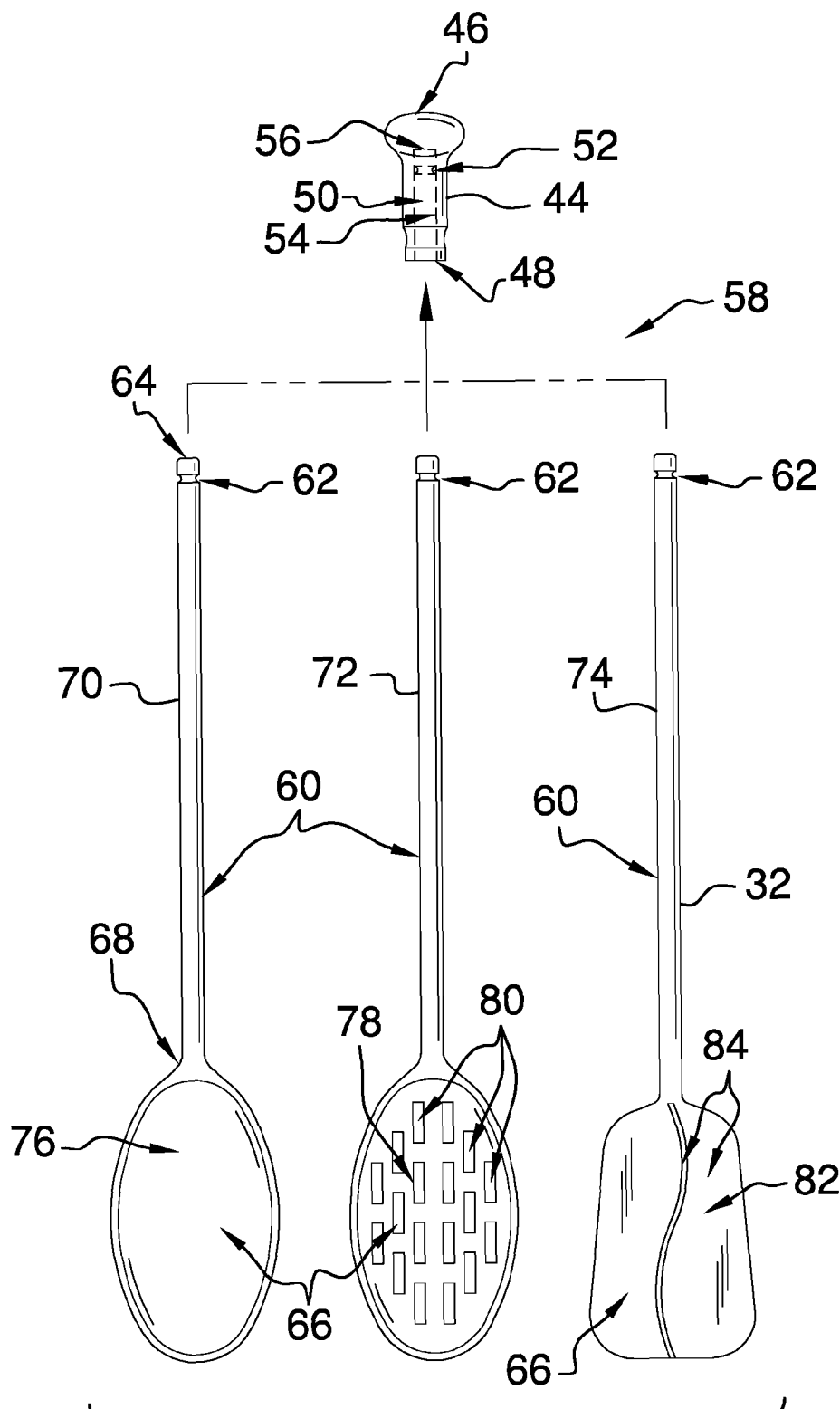
FIG. 5 is an exploded front view of an embodiment of the disclosure.

With reference now to the drawings, and in particular to FIGS. 1 through 5 thereof, a new cookware device embodying the principles and concepts of an embodiment of the disclosure and generally designated by the reference numeral 10 will be described.

As best illustrated in FIGS. 1 through 5, an integrated closure-stirrer cookware device 10 generally comprises a pot 12 that has an open top 14. The pot 12 comprises metal, preferably stainless steel. The device 10 includes an outer lid 16 that is complementary to the open top 14. The outer lid 16 is reversibly couplable to the pot 12, such that the outer lid 16 is not rotatable relative to the pot 12. Preferably, the outer lid 16 is circular and comprises metal. More preferably, the outer lid 16 comprises copper.

An opening 18 is positioned in the outer lid 16. The opening 18 is circular. An inner lid 20 that is complementary to the opening 18 is sealably and rotatably coupled to the outer lid 16. The inner lid 20 is positioned within the opening 18 such that the inner lid 20 is rotatable relative to the outer lid 16. Preferably, the inner lid 20 comprises glass. More preferably, the inner lid 20 comprises tempered glass. More specifically, a sealed bearing 22 is sealably coupled to and extends between the inner lid 20 and the outer lid 16, such that the inner lid 20 is rotatable relative to the outer lid 16.

Each of a plurality of notches 24 is positioned in a rim 26 of the pot 12. A plurality of tabs 28 is coupled to a circumference 30 of the outer lid 16. Each tab 28 is complementary to a respective notch 24, wherein the outer lid 16 is positionable in the open top 14 with each tab 28 inserted into the respective notch 24 to prevent rotation of the outer lid 16 relative to the pot 12. The tabs 28 are evenly spaced around the circumference 30. Preferably, the plurality of tabs 28 comprising four tabs 28 spaced at 90 degrees around the circumference 30 of the outer lid 16.

A stirrer 32 that has a top end 34 and a working end 36 is positioned through a penetration 38 positioned in the inner lid 20. The penetration 38 is positioned proximate to a perimeter 40 of the inner lid 20. The working end 36 extends transversely from a bottom 42 of the inner lid 20. More specifically, a knob 44, which is complementary to the penetration 38, is positioned through the penetration 38. The knob 44 is sealably, pivotally and rotatably coupled to the inner lid 20. The knob 44, which is resilient, comprises a rounded top 46 and a flat bottom 48. A channel 50 extends longitudinally upwardly from the flat bottom 48 of the knob 44. The channel 50 is substantially circular when viewed longitudinally. An annular extrusion 52, which is resilient, is coupled to an interior face 54 of the channel 50 proximate to an upper edge 56 of the channel 50.

The stirrer 32 may comprise a plurality of stirrers 58, each comprising a rod 60. The rod 60 is substantially circular when viewed longitudinally. An annular indentation 62 is positioned proximate to an upper terminus 64 of the rod 60. The annular indentation 62 is complementary to the annular extrusion 52. The upper terminus 64 of the rod 60 is insertable into the channel 50 with the annular extrusion 52 reversibly coupling to the annular indentation 62. A mixer 66 is coupled to a second terminus 68 of the rod 60.

The plurality of stirrers 58 may comprise a first stirrer 70, a second stirrer 72 and a third stirrer 74. The mixer 66 of the first stirrer 70 comprises a first spoon bowl 76. The mixer 66 of the second stirrer 72 comprises a second spoon bowl 78. A plurality of slots 80 is positioned in the second spoon bowl 78. The mixer 66 of the third stirrer 74 comprises a beater 82. The beater 82 comprises a pair of panels 84. Each panel 84 is substantially coplanar with the rod 60. The panels 84 are mutually coupled such that one panel 84 bisects the other panel 84. Each panel 84 comprises an opposing pair of arcuate curves 86.

The pot 12 may comprise a plurality of pots 88. Each pot 88 has a respective rim 26 complementary to the circumference 30 of the outer lid 16, and each pot 88 has a handle 90. The plurality of pots 88 may comprise a first pot 92 and a second pot 94. The first pot 92 has a capacity of six to twelve liters, and the second pot 94 has a capacity of two to six liters. Preferably, the first pot 92 has a capacity of seven to ten liters and the second pot 94 has a capacity of three to five and one half liters. More preferably, the first pot 92 has a capacity of eight to nine liters and the second pot 94 having a capacity of four to five liters.

The handle 90 of the first pot 92 comprises a pair of grabs 96. The grabs 96 are coupled to an exterior 98 of the first pot 92 proximate to the rim 26. The grabs 96 are positioned equally distant around the rim 26. Each grab 96 comprises a pair of arms 100 and a center piece 102. Each arm 100 is coupled to the first pot 92 and the center piece 102 is coupled to and extends between the arms 100 distal from the first pot 92. The handle 90 of the second pot 94 comprises a shaft 104 that has a first end 106 coupled to the exterior 98 of the second pot 94. The shaft 104 extends from the second pot 94 defining a second end 108 of the shaft 104. The second end 108 is rounded.

Preferably, respective stirrers 58 are sized to fit the first pot 92 and respective stirrers 58 are sized to fit the second pot 94.

A vent 110 is positioned through the outer lid 16, such that steam escaping through the vent 110 is directed away from the inner lid 20. The vent 110 comprises a plurality of slits 112. Preferably, the slits 112 are substantially rectangularly shaped. Also preferably, the plurality of slits 112 comprises three slits 112.

In use, the open top 14 of the pot 12 is positioned to accept the outer lid 16. The tabs 28 are positionable in the notches 24 to prevent rotation of the outer lid 16 relative to the pot 12. The inner lid 20 is positioned in the opening 18 of the outer lid 16 such that the sealed bearing 22 allows rotation of the inner lid 20 relative to the outer lid 16. The knob 44 is positioned in the penetration 38 of the inner lid 20, such that the channel 50 is positioned for insertion of a rod 60. The frictional coupling of the annular extrusion 52 of the channel 50 to the annular indentation 62 of the rod 60 reversibly couples the stirrer 32 to the knob 44, such that the user can reversibly couple any of the plurality of stirrers 58 to the knob 44.

The knob 44, and by extension the stirrer 32, is rotatable within the penetration 38. The knob 44 also allows the stirrer 32 to be pivoted relative to the inner lid 20. Combined with rotation of the inner lid 20 relative to the outer lid 16, these actions allow thorough mixing of contents contained in the pot 12. The vent 110 is positioned in the outer lid 16 to allow steam to escape the pot 12 and to direct the steam away from the inner lid 20. The pot 12 comprises a plurality of pots 88 of various sizes to suit the needs of the user. Each pot 88 has an open top 14 with a rim 26 complementary to the circumference 30 of the outer lid 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An integrated closure-stirrer cookware device comprising:
    a pot, said pot having an open top;
    an outer lid, said outer lid being complementary to said open top, such that said outer lid is reversibly couplable to said pot and wherein said outer lid is not rotatable relative to said pot;
    an opening, said opening being positioned in said outer lid, said opening being circular;
    an inner lid, said inner lid being complementary to said opening, said inner lid being sealably and rotatably coupled to said outer lid, wherein said inner lid is positioned within said opening such that said inner lid is rotatable relative to said outer lid;
    a stirrer, said stirrer having a top end and a working end, said stirrer being positioned through a penetration positioned in said inner lid, said penetration being positioned proximate to a perimeter of said inner lid, such that said working end extends transversely from a bottom of said inner lid;
    a vent, said vent being positioned through said outer lid, wherein said vent is positioned in said outer lid such that steam escaping through said vent is directed away from said inner lid;
    wherein said outer lid is couplable to said pot such that said top end of said stirrer is configured to be grasped by the user to rotate said stirrer and to revolve said inner lid relative to said outer lid, wherein the contents of said pot are stirred, and wherein said vent is positioned in said outer lid to permit passage of steam;
    a plurality of notches, each said notch being positioned in a rim of said pot;
    a plurality of tabs, said tabs being coupled to a circumference of said outer lid, each said tab being complementary to a respective said notch; and
    wherein said outer lid is positionable in said open top such that each said tab is inserted into said respective said notch to prevent rotation of said outer lid relative to said pot.

2. The device of claim 1, further comprising:
    said pot comprising metal and said outer lid comprising metal; and
    said inner lid comprising glass.

3. The device of claim 2, further comprising:
    said pot comprising stainless steel;
    said outer lid comprising copper; and
    said inner lid comprising tempered glass.

4. The device of claim 1, further including a sealed bearing, said sealed bearing being sealably coupled to and extending between said inner lid and said outer lid, wherein said inner lid is rotatable relative to said outer lid.

5. The device of claim 1, further including said tabs being evenly spaced around said circumference.

6. The device of claim 1, further including said plurality of tabs comprising four tabs spaced at 90 degrees around said circumference.

7. An integrated closure-stirrer cookware device comprising:

a pot, said pot having an open top;
an outer lid, said outer lid being complementary to said open top, such that said outer lid is reversibly couplable to said pot and wherein said outer lid is not rotatable relative to said pot;
an opening, said opening being positioned in said outer lid, said opening being circular;
an inner lid, said inner lid being complementary to said opening, said inner lid being sealably and rotatably coupled to said outer lid, wherein said inner lid is positioned within said opening such that said inner lid is rotatable relative to said outer lid;
a stirrer, said stirrer having a top end and a working end, said stirrer being positioned through a penetration positioned in said inner lid, said penetration being positioned proximate to a perimeter of said inner lid, such that said working end extends transversely from a bottom of said inner lid;
a vent, said vent being positioned through said outer lid, wherein said vent is positioned in said outer lid such that steam escaping through said vent is directed away from said inner lid;
wherein said outer lid is couplable to said pot such that said top end of said stirrer is configured to be grasped by the user to rotate said stirrer and to revolve said inner lid relative to said outer lid, wherein the contents of said pot are stirred, and wherein said vent is positioned in said outer lid to permit passage of steam;
said stirrer comprising a plurality of stirrers, each said stirrer comprising:
a rod, said rod being substantially circular when viewed longitudinally;
an annular indentation, said annular indentation being positioned proximate to an upper terminus of said rod, said annular indentation being complementary to said annular extrusion, wherein said upper terminus of said rod is insertable into said channel with said annular extrusion reversibly coupling to said annular indentation; and
a mixer, said mixer being coupled to a second terminus of said rod.

8. The device of claim 7, further including said plurality of stirrers comprising:
a first stirrer, said mixer of said first stirrer comprising a first spoon bowl;
a second stirrer, said mixer of said second stirrer comprising a second spoon bowl;
a plurality of slots, said plurality of slots being positioned in said second spoon bowl; and
a third stirrer, said mixer of said third stirrer comprising a beater, said beater comprising a pair of panels, each said panel being substantially coplanar with said rod, said panels being mutually coupled such that one said panel bisects the other said panel, each said panel comprising an opposing pair of arcuate curves.

9. The device of claim 1, further including said pot comprising a plurality of pots, each said pot having a respective said rim complementary to said circumference of said outer lid, each said pot having a handle.

10. The device of claim 9, further including said plurality of pots comprising a first pot and a second pot.

11. The device of claim 10, further including said first pot having a capacity of six to twelve liters, said second pot having a capacity of two to six liters.

12. The device of claim 11, further including said first pot having a capacity of seven to ten liters, said second pot having a capacity of three to five and one half liters.

13. The device of claim 12, further including said first pot having a capacity of eight to nine liters, said second pot having a capacity of four to five liters.

14. An integrated closure-stirrer cookware device comprising:
a pot, said pot having an open top;
an outer lid, said outer lid being complementary to said open top, such that said outer lid is reversibly couplable to said pot and wherein said outer lid is not rotatable relative to said pot;
an opening, said opening being positioned in said outer lid, said opening being circular;
an inner lid, said inner lid being complementary to said opening, said inner lid being sealably and rotatably coupled to said outer lid, wherein said inner lid is positioned within said opening such that said inner lid is rotatable relative to said outer lid;
a stirrer, said stirrer having a top end and a working end, said stirrer being positioned through a penetration positioned in said inner lid, said penetration being positioned proximate to a perimeter of said inner lid, such that said working end extends transversely from a bottom of said inner lid;
a vent, said vent being positioned through said outer lid, wherein said vent is positioned in said outer lid such that steam escaping through said vent is directed away from said inner lid;
wherein said outer lid is couplable to said pot such that said top end of said stirrer is configured to be grasped by the user to rotate said stirrer and to revolve said inner lid relative to said outer lid, wherein the contents of said pot are stirred, and wherein said vent is positioned in said outer lid to permit passage of steam;
said pot comprising a plurality of pots, each said pot having a respective said rim complementary to said circumference of said outer lid, each said pot having a handle, said plurality of pots comprising a first pot and a second pot;
said handle of said first pot comprising a pair of grabs, said grabs being coupled to an exterior of said first pot, said grabs being positioned proximate to said rim;
said grabs being positioned equally distant around said rim;
each said grab comprising a pair of arms and a center piece, each said arm being coupled to said first pot, said center piece being coupled to and extending between said arms distal from said first pot; and
said handle of said second pot comprising a shaft, said shaft having a first end coupled to an exterior of said second pot, said shaft extending from said second pot defining a second end, said second end being rounded.

15. The device of claim 10, further comprising:
said stirrer being one of a plurality of stirrers;
respective said stirrers being sized for said first pot; and
respective said stirrers being sized for said second pot.

16. The device of claim 1, further including said vent comprising a plurality of slits.

17. The device of claim 16, further including said slits being substantially rectangularly shaped, said plurality of slits comprising three slits.

18. An integrated closure-stirrer cookware device comprising:
a pot, said pot having an open top;
an outer lid, said outer lid being complementary to said open top, such that said outer lid is reversibly couplable to said pot and wherein said outer lid is not rotatable relative to said pot;

an opening, said opening being positioned in said outer lid, said opening being circular;

an inner lid, said inner lid being complementary to said opening, said inner lid being sealably and rotatably coupled to said outer lid, wherein said inner lid is positioned within said opening such that said inner lid is rotatable relative to said outer lid;

a stirrer, said stirrer having a top end and a working end, said stirrer being positioned through a penetration positioned in said inner lid, said penetration being positioned proximate to a perimeter of said inner lid, such that said working end extends transversely from a bottom of said inner lid;

a vent, said vent being positioned through said outer lid, wherein said vent is positioned in said outer lid such that steam escaping through said vent is directed away from said inner lid;

wherein said outer lid is couplable to said pot such that said top end of said stirrer is configured to be grasped by the user to rotate said stirrer and to revolve said inner lid relative to said outer lid, wherein the contents of said pot are stirred, and wherein said vent is positioned in said outer lid to permit passage of steam;

a knob, said knob being complementary to said penetration, said knob being positioned through said penetration, said knob being sealably, pivotally and rotatably coupled to said inner lid, said knob comprising a rounded top and a flat bottom, said knob being resilient;

a channel, said channel extending longitudinally upwardly from said flat bottom of said knob, said channel being substantially circular when viewed longitudinally; and an annular extrusion, said annular extrusion being coupled to an interior face of said channel proximate to an upper edge of said channel, said annular extrusion being resilient.

19. An integrated stirring and closure cookware device comprising:

a pot, said pot having an open top, said pot comprising metal, said pot comprising stainless steel;

an outer lid, said outer lid being complementary to said open top, such that said outer lid is reversibly couplable to said pot and wherein said outer lid is not rotatable relative to said pot, said outer lid being circular, said outer lid comprising metal, said outer lid comprising copper;

an opening, said opening being positioned in said outer lid, said opening being circular;

an inner lid, said inner lid being complementary to said opening, said inner lid being sealably and rotatably coupled to said outer lid, wherein said inner lid is positioned within said opening such that said inner lid is rotatable relative to said outer lid, said inner lid comprising glass, said inner lid comprising tempered glass;

a sealed bearing, said sealed bearing being sealably coupled to and extending between said inner lid and said outer lid, wherein said inner lid is rotatable relative to said outer lid;

a plurality of notches, each said notch being positioned in a rim of said pot;

a plurality of tabs, said tabs being coupled to a circumference of said outer lid, each said tab being complementary to a respective said notch, wherein said outer lid is positionable in said open top such that each said tab is inserted into said respective said notch to prevent rotation of said outer lid relative to said pot, said tabs being evenly spaced around said circumference, said plurality of tabs comprising four tabs spaced at 90 degrees around said circumference;

a stirrer, said stirrer having a top end and a working end, said stirrer being positioned through a penetration positioned in said inner lid, said penetration being positioned proximate to a perimeter of said inner lid, such that said working end extends transversely from a bottom of said inner lid;

a knob, said knob being complementary to said penetration, said knob being positioned through said penetration, said knob being sealably, pivotally and rotatably coupled to said inner lid, said knob comprising a rounded top and a flat bottom, said knob being resilient, a channel, said channel extending longitudinally upwardly from said flat bottom of said knob, said channel being substantially circular when viewed longitudinally, an annular extrusion, said annular extrusion being coupled to an interior face of said channel proximate to an upper edge of said channel, said annular extrusion being resilient, said stirrer comprising a plurality of stirrers, each said stirrer comprising:

a rod, said rod being substantially circular when viewed longitudinally, an annular indentation, said annular indentation being positioned proximate to an upper terminus of said rod, said annular indentation being complementary to said annular extrusion, wherein said upper terminus of said rod is insertable into said channel with said annular extrusion reversibly coupling to said annular indentation, and a mixer, said mixer being coupled to a second terminus of said rod;

said plurality of stirrers comprising:

a first stirrer, said mixer of said first stirrer comprising a first spoon bowl, a second stirrer, said mixer of said second stirrer comprising a second spoon bowl, a plurality of slots, said plurality of slots being positioned in said second spoon bowl, and a third stirrer, said mixer of said third stirrer comprising a beater, said beater comprising a pair of panels, each said panel being substantially coplanar with said rod, said panels being mutually coupled such that one said panel bisects the other said panel, each said panel comprising an opposing pair of arcuate curves;

said pot comprising a plurality of pots, each said pot having a respective said rim complementary to said circumference of said outer lid, each said pot having a handle;

said plurality of pots comprising a first pot and a second pot, said first pot having a capacity of six to twelve liters, said second pot having a capacity of two to six liters, said first pot having a capacity of seven to ten liters, said second pot having a capacity of three to five and one half liters, said first pot having a capacity of eight to nine liters, said second pot having a capacity of four to five liters;

said handle of said first pot comprising a pair of grabs, said grabs being coupled to an exterior of said first pot, said grabs being positioned proximate to said rim, said grabs being positioned equally distant around said rim, each said grab comprising a pair of arms and a center piece, each said arm being coupled to said first pot, said center piece being coupled to and extending between said arms distal from said first pot;

said handle of said second pot comprising a shaft, said shaft having a first end coupled to an exterior of said second pot, said shaft extending from said second pot defining a second end, said second end being rounded;

respective said stirrers being sized for said first pot, respective said stirrers being sized for said second pot;

a vent, said vent being positioned through said outer lid, wherein said vent is positioned in said outer lid such that steam escaping through said vent is directed away from said inner lid, said vent comprising a plurality of slits, said slits being substantially rectangularly shaped, said plurality of slits comprising three slits; and wherein said outer lid is couplable to said pot such that said knob is configured to be grasped by the user to rotate said stirrer and to revolve said inner lid relative to said outer lid, wherein the contents of said pot are stirred, and wherein said vent is positioned in said outer lid to permit passage of steam.

* * * * *